United States Patent [19]

Presby

[11] Patent Number: 4,820,321

[45] Date of Patent: Apr. 11, 1989

[54] METHOD AND APPARATUS FOR FABRICATING AN EXPANDED BEAM CYLINDRICALLY TERMINATED OPTICAL FIBER TAPER

[75] Inventor: Herman M. Presby, Highland Park, N.J.

[73] Assignees: American Telephone and Telegraph Company, New York, N.Y.; AT&T Bell Laboratories, Murray Hill, N.J.

[21] Appl. No.: 85,048

[22] Filed: Aug. 13, 1987

[51] Int. Cl.$^4$ .................................. C03B 37/025
[52] U.S. Cl. .................................. 65/2; 65/12; 65/13; 65/103; 65/105; 65/112; 65/292
[58] Field of Search .................. 65/2, 3.11, 3.2, 4.2, 65/12, 13, 29, 103, 105, 112, 120, 162, 174, 272, 292, 4.21, 271, 268

[56] References Cited

U.S. PATENT DOCUMENTS

| | | | |
|---|---|---|---|
| 3,556,758 | 1/1971 | Andrews et al. | 65/109 |
| 3,860,408 | 1/1975 | Mastik | 65/105 |
| 3,874,867 | 4/1975 | Dichter | 65/272 |
| 4,010,022 | 3/1977 | Schul | 65/109 |
| 4,198,223 | 4/1980 | Goell et al. | 65/3 A |
| 4,426,215 | 1/1984 | Murphy et al. | 65/4.21 |
| 4,533,378 | 8/1985 | Paek et al. | 65/13 |
| 4,565,558 | 1/1986 | Keil et al. | 65/1 |
| 4,589,897 | 5/1986 | Mathyssek et al. | 65/2 |
| 4,591,372 | 5/1986 | Bricheno | 65/4.2 |
| 4,622,055 | 11/1986 | Mathyssek et al. | 65/2 |
| 4,631,079 | 12/1986 | Clark | 65/13 |
| 4,675,043 | 6/1987 | Conta et al. | 65/162 |
| 4,704,151 | 11/1987 | Keck | 65/4.2 |

OTHER PUBLICATIONS

*Elec. Commun.*, vol. 51, No. 2 (1976), pp. 85–91, M. A. Bedgood et al., "Demountable Connectors for Optical Fiber Systems".
*Fiber Optics-Advances in Research and Develop.*, "Fiber Drawing (Plenum Press, New York, 1979), Process: Characterization & Control", R. E. Jaeger, pp. 33–36.
*J. Lightwave Technol.*, vol. LT-2, No. 3, Jun. 1984, "Progress in Monomode Optical-Fiber Interconnection Devices", G. Khoe et al., pp. 217–227.
*J. Opt. Commun.*, vol. 6, No. 4, Dec. 1985, "Fabrication and Investigation of Drawn Fiber Tapers . . . ", K. Mathyssek et al., pp. 142–146.
*Electronic Letters*, vol. 22, No. 13, Jun. 19, 1986, "Single-Mode Optical Fibre Tapers . . . ", N. Amitay et al., pp. 702–703.
*J Lightwave Technol.*, vol. LT-5, No. 1, Jan. 1987, "Optical Fiber Tapers-7A Novel Approach to Self-Aligned Beam Expansion . . . ", N. Amitay et al., pp. 70–76.

*Primary Examiner*—Kenneth M. Schor
*Attorney, Agent, or Firm*—Erwin W. Pfeifle

[57] ABSTRACT

An apparatus and method are disclosed for fabricating an expanded beam cylindrical terminated optical fiber taper from a reduced diameter preform rod. The present invention comprises uniformly heating the circumference of a predetermined portion at an intermediate point of the preform rod to a predetermined temperature and then uniformly pulling the preform rod while continuing to heat additional material of the preform rod to produce a pair of expanded beam cylindrically terminated optical fiber tapers connected by a predetermined length cylindrical central section of standard optical fiber having a uniform diameter less than that of the original preform rod. The cylindrical central section is then served midway between the two expanded beam optical fiber tapers to form two separate expanded beam cylindrically terminated optical fiber tapers comprised of (1) a predetermined length cylindrical end section of uniform diameter equal to that of the original preform rod; (2) a reduced diameter optical fiber end section suitable for splicing onto an optical fiber of similar dimensions; and (3) a tapered section, connecting the cylindrical end section to the optical fiber end section, having a gradually decreasing diameter that will avoid mode conversion of a lightwave signal propagating therethrough.

4 Claims, 3 Drawing Sheets

METHOD AND APPARATUS FOR FABRICATING AN EXPANDED BEAM CYLINDRICALLY TERMINATED OPTICAL FIBER TAPER

TECHNICAL FIELD

The present invention relates to a method and apparatus for fabricating optical fiber tapers and, more particularly, an optical fiber taper having expansion optics comprising a long uniform diameter section of a standard optical fiber gradually expanding through a tapered section into a cylindrical section of enlarged dimensions.

DESCRIPTION OF THE PRIOR ART

Optical fiber technology is a rapidly developing and maturing technology. Research in optical fiber technology has provided high quality optical fiber with improved transmission characteristics. This, in turn, has allowed the use of optical fiber in voice and data communication systems to continue to expand and the number of commercial applications of fiber optics to increase. Currently, optical fiber technology is being implemented in local area networks, long distance terrestrial systems and even longer distant submarine systems. As the area serviced by these communication systems expands the number of fiber connections also increases thus creating the need for improved fiber connectors and couplers having low loss and minimal distortion.

Presently there are two categories of fiber to fiber connections: fiber splicing and demountable connectors. Fiber splicing involves forming a permanent joint between two individual optical fibers using fusion or mechanical techniques. Demountable fiber connectors allow for the connection and disconnection, with reproducible accurate fiber alignment, of two individual optical fibers. The types of demountable fiber connectors currently in use include the ferrule, biconical, ceramic capillary, double eccentric, and expanded beam connector.

An expanded beam connector optically collimates the light beam on the launch side of a connector pair and then refocuses the beam into the receive fiber. Expanded beam optics have also been used to couple fibers to light sources and detectors. Connections and couplers that use expanded beam optics, compared to other techniques, make the achievement of lateral and axial alignment much less critical and the increased beam diameter reduces the effect of dust and dirt at the connection. Approaches used to implement expanded beam connectors and couplers have included forming spherical microlenses, glass bead lenses, and tapers on the end of a fiber. Optical fibers having a tapered expanded beam structure, in addition to the axial and lateral alignment improvements, also provide an angular alignment that is less stringent than that of lens structures.

Various apparatus and methods for manufacturing optical fiber components are described in the prior art. U.S. Pat. No. 4,565,558 issued to Keil et al. on Jan 21, 1986 describes an apparatus for manufacturing a reduced diameter section in a fiber having a stretching device for pulling the fiber and a heating device for brief local heating of the stretched fiber to a softening temperature. The method described in U.S. Pat. No. 4,589,897 issued to Mathyssek et al. on May 20, 1986 manufactures an optical fiber with a smaller diameter tapered end having a refractive lens, the method comprises heating a fiber while subject to a tensile force to create a reduced diameter section therein, severing it at the reduced diameter section to form two fibers having tapered ends and melting the severed fiber to form the refractive lens.

A practical and novel expanded beam optical fiber taper is shown in FIG. 1(c) in the article by N. Amitay et al., "Optical Fiber Tapers - A Novel Approach to Self-Aligned Beam Expansion and Single-Mode Hardware," *J. Lightwave Technol.*, Vol. LT-5, No. 1, January 1987 at pages 70-76. The disclosed taper has a structure comprising a fiber pigtail and a tapered section followed by a cylindrical section of enlarged dimensions such that, for example, when a pair of these tapers are butted together to connect two fibers there is no mode conversion or coupling therethrough and the effects of lateral and axial misalignment are minimized.

The problem remaining in the prior art is to provide an accurate, efficient, reproducible and inexpensive method and apparatus for fabricating the expanded beam optical fiber taper shown in FIG. 1(c) in the N. Amitay et al. article.

SUMMARY OF THE INVENTION

The foregoing problem in the prior art has been solved in accordance with the present invention which relates to an apparatus and method for fabricating expanded beam optical fiber tapers from a reduced diameter optical preform rod, wherein the fabricated taper comprises a predetermined length cylindrical section of uniform diameter equal to that of the reduced diameter preform rod transitioning into a tapered section having a gradually decreasing diameter and then into a predetermined length of standard diameter optical fiber.

An aspect of the present invention is a method for fabricating an expanded beam cylindrically terminated optical fiber taper comprising the steps of (1) holding a reduced diameter optical preform rod, including a core and cladding surrounding the core, where the outside diameter of the preform rod is greater than that of a standard optical fiber and is less than that of a standard optical fiber preform rod; (2) uniformly heating the circumference of a predetermined section at an intermediate point of the preform rod to the melting point of the preform rod. When the melting point of the preform rod is attained, while continuing to heat the predetermined section of the preform rod, the preform rod is uniformly pulled longitudinally to form a pair of optical fiber tapers connected by a predetermined length of standard optical fiber having a uniform diameter less than that of the preform rod. The pair of tapers are then severed by cutting the reduced diameter optical fiber midway between the tapers.

Other and further aspects of the present invention will become apparent during the course of the following description and by reference to the accompanying drawings.

DETAILED DESCRIPTION

Figure 1:
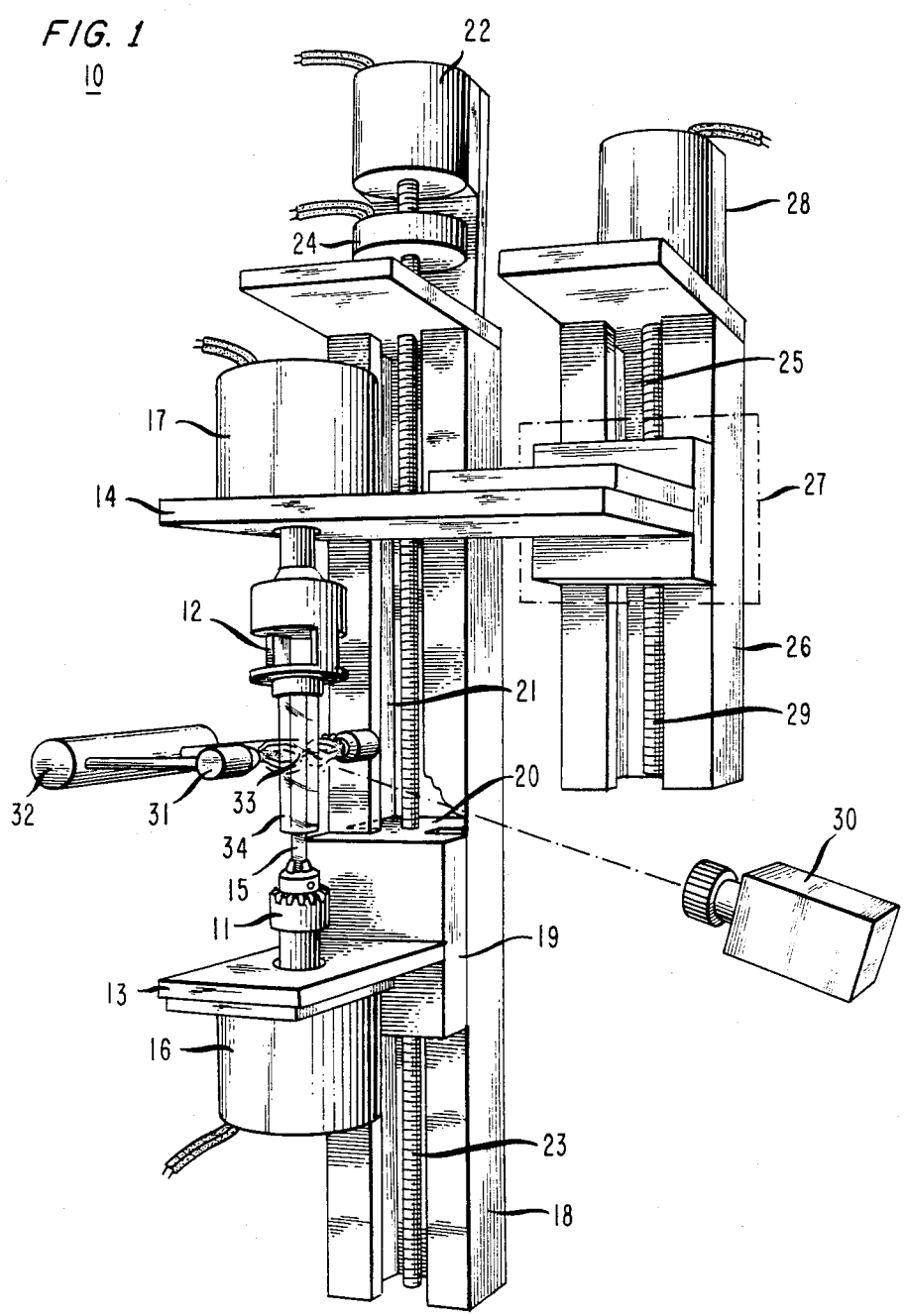
FIG. 1 is a perspective view of a preferred embodiment of an apparatus for practicing a method in accordance with the present invention.
Figure 2:
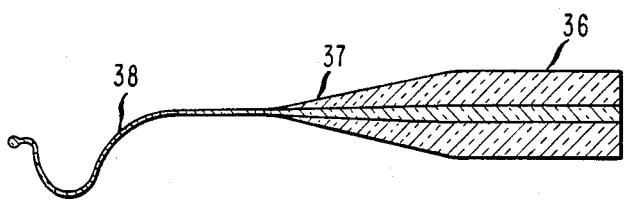
FIG. 2 illustrates an expanded beam optical fiber taper including a gradually expanded cylindrical end fabricated in acordance with the present invention.
Figure 3:
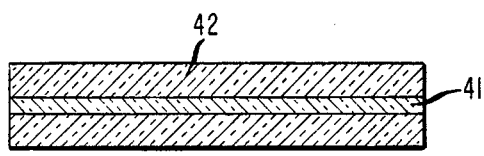
FIG. 3 illustrates a reduced diameter optical preform rod including a core and cladding surrounding the core.

FIG. 1 shows a preferred embodiment of an apparatus 10 for fabricating an expanded beam cylindrically terminated optical fiber taper 35, as shown in FIG. 2, in accordance with the present invention. Apparatus 10 shown in FIG. 1 includes a first 11 and a second 12 holding means rotatably mounted on a first 13 and a second 14 movable carriage, respectively, for holding respective first and second opposite ends of a reduced diameter optical preform rod 15 from which the expanded beam cylindrically terminated optical fiber taper 35 will be made. The fabricated expanded beam cylindrically terminated optical fiber taper 35, in FIG. 2, comprises a cylindrical end section 36 corresponding in diameter to the diameter of the original reduced diameter optical preform rod 15, a standard diameter optical fiber pigtail end section 38 suitable for splicing to an optical fiber of similar dimensions, and a down-tapered section 37 connecting cylindrical end section 36 and optical fiber pigtail end section 38 that will avoid mode conversion of a lightwave signal propagating therein. As shown in FIG. 3, reduced diameter optical perform rod 15 comprises a core 41 surrounded by a cladding layer 42 with a first and a second uniform index of refraction, respectively, throughout. The reduced diameter optical preform rod 15 also includes an external diameter, equal to the desired diameter of cylindrical end section 36 of the expanded beam cylindrically terminated optical fiber taper 35 shown in FIG. 2, which is greater than the diameter of a standard optical fiber, e.g., 125 micrometers for a single-mode fiber, but is less than the diameter of a standard optical preform rod, e.g., 2.5 centimeters. Reduced diameter optical preform rod 15 can be derived by any suitable technique such as, for example, reducing the diameter of a standard diameter optical preform rod using a standard pulling tower.

FIG. 1 shows each holding means 11 and 12 as exemplary chucks similar to those commonly used in a drill press or lathe to hold a tool or workpiece. First and second holding means 11 and 12 are coupled to a means capable of selectively rotating the reduced diameter optical preform rod 15 at a uniform rate and insuring that no torsion is applied to the reduced diameter optical preform rod 15 as it rotates. For example, in FIG. 1, the means shown for rotating the reduced diameter optical preform rod 15 comprises separate synchronous motors 16 and 17 coupled to holding means 11 and 12, respectively. It is to be understood, however, that synchronous motors 16 and 17 are only for purposes of illustration and not for purposes of limitation and that any suitable arrangement for synchronously rotating the first 11 and second 12 holding means can be used, such as, for example, a single motor directly coupled to both holding means 11 and 12.

First movable carriage 13 engages a drive on a first frame 18, for selectively moving first carriage 13 along the length of first frame 18 parallel to a longitudinal axis of the reduced diameter optical preform rod 15 at a first predetermined uniform rate. More particularly FIG. 1 shows first carriage 13 as including a plate 10 with a T-shaped extension 20 that slides within a corresponding shaped groove 21 extending the length of first frame 18 to guide first carriage 13 as it moves along first frame 18. First frame 18 is positioned to permit the movement of first carriage 13, as it is guided by the T-shaped extension 20 and groove 21 arrangement, parallel to the longitudinal axis of the reduced diameter optical preform rod 15. The drive on first frame 18 is shown as a motor 22 which rotates a threaded rod 23 that meshes with a threaded sleeve (not shown) in the T-shaped extension 20 of the guiding arrangement of first carriage 13, to move first carriage 13 at the first predetermined uniform rate along first frame 18 in either a first or second opposite direction depending on the rotation of motor 22 and threaded rod 23. A selectively activated clutch 24 is used to couple motor 22 to threaded rod 23 and provide a means for insuring that a uniform torque is applied to, and removed from, threaded rod 23.

Second carriage 14 also engages a drive on a second frame 26, for selectively moving second carriage 14 along the length of second frame 26 parallel to the longitudinal axis of the reduced diameter optical preform rod 15 at a second predetermined uniform rate. A guide arrangement 27 for second carriage 14, including a T-shaped extension (not shown) and a corresponding groove 25 similar to the T-shaped extension 20 and groove 21 used for guiding first carriage 13, guides second carriage 14 along second frame 26. Second frame 26 is positioned to permit the movement of second carriage 14 parallel to the longitudinal axis of the reduced diameter optical preform rod 15. The drive on second frame 26 is shown as a motor 28 which rotates a threaded rod 29 that meshes with a threaded sleeve (not shown) in the T-shaped extension (not shown) of the guide arrangement 27 of second carriage 14 to move the second carriage 14 at the second predetermined uniform rate along the second frame 26 in either a first or second opposite direction depending on the rotation of motor 28 and threaded rod 29. It is to be understood that both the drives and the means for guiding carriages 13 and 14 on first and second frames 18 and 26, respectively, can comprise any suitable arrangement for providing the functions described.

A heat source 31, shown in FIG. 1 as an exemplary oxyhydrogen torch, is positioned by a support 32 adjacent to, and directed at, a predetermined portion 33 at an intermediate point of reduced diameter optical preform rod 15 where the expanded beam cylindrically terminated optical fiber tapers 35 are to be formed. To concurrently produce two expanded beam cylindrically terminated optical fiber tapers 35 from each reduced diameter optical preform rod 15, heat source 31 should provide a unform heat around a circumference of predetermined portion 33 of reduced diameter optical preform rod 15. It should be noted that a flame from an oxyhydrogen torch will not uniformly heat the circumference of a stationary reduced diameter optical preform rod 15. One technique for uniformly heating the reduced diameter optical preform rod 15 with the exemplary oxyhydrogen torch heat source 31, is to mount reduced diameter optical preform rod 15 within a shielding tube 34 in holding means 12 and then rotate both the reduced diameter optical preform rod 15 and shielding tube 34 using synchronous motors 16 and 17. Shielding tube 34 is preferably formed from a material, such as, for example, either silica or a ceramic, for providing both inductive heating to the reduced diameter optical preform rod 15 and a means for protecting reduced diameter optical preform rod 15 from being burned by the direct heat from the oxyhydrogen torch heat source 31.

It is to be understood that the use of an oxyhydrogen torch for heat source 31 is for purposes of illustration and not for purposes of limitation, and that any other suitable heat source such as, for example, a $CO_2$ laser or an electric furnace could be substituted. When using a $CO_2$ laser as heat source 31, the reduced diameter optical preform rod 15 is rotated to provide uniform heating, but shielding tube 34 is not required since there is no danger of burning the reduced diameter optical preform rod 15. When an electric furnace is used for heat source 31, neither shielding tube 34 nor rotation of the reduced diameter optical preform rod 15 is necessary since the electric furnace provides uniform heating. A temperature sensing device 30, such as an exemplary optical pyrometer, is directed at predetermined portion 33 of reduced diameter optical preform rod 15 to detect when predetermined portion 33 has attained a predetermined temperature to permit the initiation of the operation of apparatus 10 as described herebelow and produce the pair of expanded beam cylindrically terminated optical fiber tapers 35.

In operation, the first and second opposite ends of a reduced diameter optical preform rod 15 are mounted in the first and second holding means 11 and 12, respectively, within a shielding tube 34. With the heat source 31 deactivated, carriages 13 and 14 are moved along frames 18 and 26 using motors 22 and 28, respectively, to move the reduced diameter optical preform rod 15 to a predetermined position so that, when the heat source 31 is activated, a predetermined portion 33 at an intermediate point of reduced diameter optical preform rod 15 will be heated by heat source 31. Motor 28 on second frame 26 is deactivated and motor 22 on first frame 18 is energized while clutch 24 remains deactivated to decouple motor 22 from the threaded rod 23.

Synchronous motors 16 and 17 are then energized to rotate both the reduced diameter optical preform rod 15 and shielding tube 34, after which the oxyhydrogen torch forming heat source 31 is ignited to begin uniformly heating a circumference of the predetermined portion 33 of reduced diameter optical preform rod 15. When temperature sensing device 30 detects that a predetermined temperature has been attained at the heated predetermined portion 33 of reduced diameter optical preform rod 15, clutch 24 on first frame 18 is activated to couple motor 22 to threaded rod 23 allowing motor 22 to uniformly rotate threaded rod 23 in a direction to cause first carriage 13 to move along the first frame 18 away from second carriage 14 at the first predetermined uniform rate. This causes the heated predetermined portion 33 to elongate along the longitudinal axis of reduced diameter optical preform rod 15 to start the forming of a pair of expanded beam cylindrically terminated optical fiber tapers 35 in accordance with the present invention.

Figure 4:
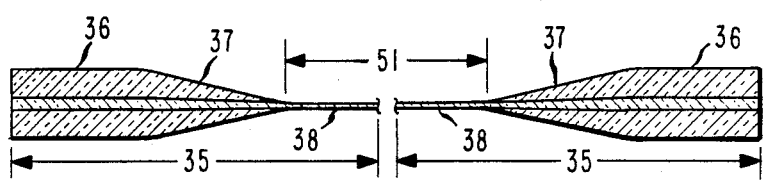
FIG. 4 illustrates a final workpiece, fabricated using the apparatus 10 in FIG. 1, comprising a pair of expanded beam cylindrically terminated optical fiber tapers of FIG. 2 connected by a length of standard diameter optical fiber.

As first carriage 13 continues its uniform movement away from second carriage 14, a point will be reached when a desired standard optical fiber diameter is attained and the continued drawing of such optical fiber diameter into a predetermined length cylindrical central section 51 of standard diameter optical fiber, as shown in FIG. 4, between the two down-tapered sections 37 of a pair of expanded beam cylindrically terminated optical fiber tapers 35 is desired. To provide continued material from reduced diameter optical preform rod 15 for heating and drawing such predetermined length of standard diameter optical fiber for the cylindrical central section 51, motor 28 is energized to uniformly rotate threaded rod 29 in a direction to cause second carriage 14 to travel along second frame 26 in the direction of first carriage 13 at the second predetermined uniform rate. Movement of second carriage 14 towards first carriage 13 causes the section of reduced diameter optical preform rod 15 that is uniformly heated by heat source 31 to slowly move from the predetermined portion 33 towards the second carriage 14. The drawing process continues until a desired final workpiece 50, shown in FIG. 4, is formed comprising a pair of oppositely directed expanded beam cylindrically terminated optical fiber tapers 35 connected by a predetermined length cylindrical central section 51 of standard diameter optical fiber. When the predetermined length cylindrical central section 51 of standard diameter optical fiber is attained, the heat source 31 is extinguished and clutch 24 and motors 16, 17, 22 and 28 are deactivated.

Figure 6:
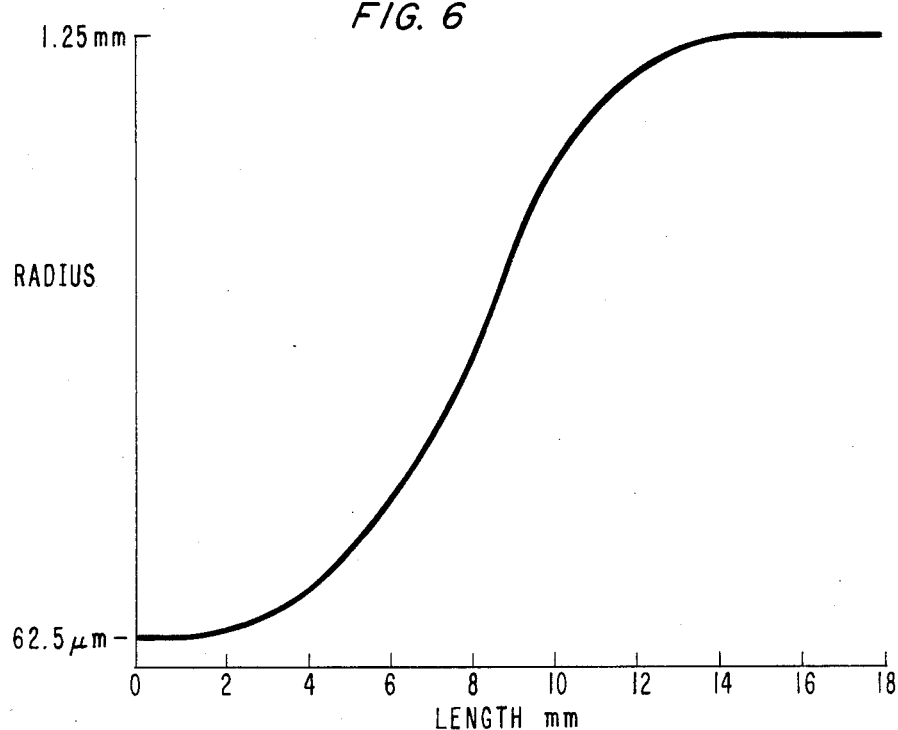
FIG. 6 is a plot relating the radius to the length, of an exemplary expanded beam optical fiber taper, as shown in FIG. 2, from the standard single-mode optical fiber pigtail end section to the cylindrical end section.
Figure 5:
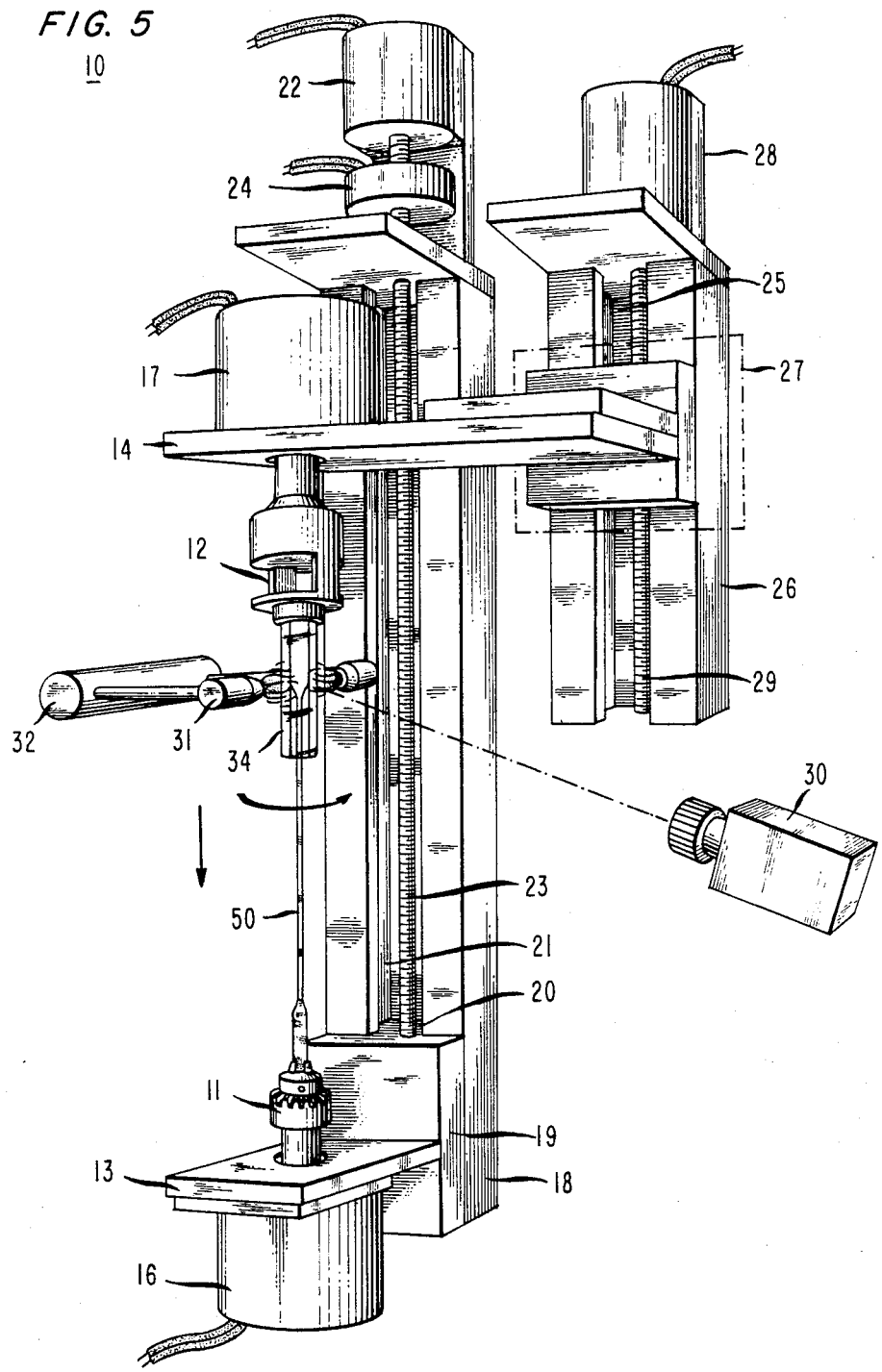
FIG. 5 is a perspective view of apparatus 10 in FIG. 1 after heating and pulling the preform rod, but prior to removing the final workpiece.

FIG. 5 shows apparatus 10 at the completion of the drawing process before the final workpiece 50 is removed from the pair of holding means 11 and 12. The final workpiece 50 is severed near the center of the standard diameter optical fiber cylindrical central section 51 to create a pair of expanded beam cylindrically terminated optical fiber tapers 35, shown in FIG. 2, each having a cylindrical end section 36 corresponding in diameter to the diameter of the original reduced diameter optical preform rod 15, a standard diameter optical fiber pigtail end section 38 suitable for splicing to an optical fiber of similar dimensions, and a down-tapered section 37 connecting cylindrical end section 36 and optical fiber pigtail end section 38 that will maintain a mode or modes propagating therein. For example, an optical fiber pigtail end section 38, suitable for splicing to an exemplary single-mode optical fiber, comprises (1) a core having a diameter of, for example, approximately 5–10 micrometers; (2) a cladding, surrounding the core, having an external diameter of, for example, 120–125 micrometers; and (3) a length of, for example, approximately 11–13 inches. FIG. 6 shows a plot that details the longitudinal cross-sectional shape of an exemplary expanded beam cylindrically terminated optical fiber taper 35 fabricated using the present method and apparatus 10. The plot relates the radius to the length, of an exemplary expanded beam cylindrically terminated optical fiber taper 35 from the standard single-mode optical fiber pigtail end section 38 to the cylindrical end section 36. When, for example, a pair of expanded beam cylindrically terminated optical fiber tapers 35 are spliced onto a pair of single-mode optical fibers to be used as a demountable connection between the single-mode optical fibers, the exposed cylindrical end sections 36 can be butted together and aligned using any suitable fiber connector. Because of the enlarged core diameter in the expanded cylindrical end sections 36, the resulting single-mode connector has a high tolerance to misalignment and the present taper configuration also avoids mode conversion therethrough.

In the foregoing discussion, it is to be understood that the above-described embodiment and method of operation are simply illustrative of an apparatus and a method for fabricating an expanded beam cylindrically terminated optical fiber taper 35. Other suitable variations and modifications could be made to the method described, to apparatus 10 in FIG. 1, or in the dimensions in FIG. 6 and still remain within the scope of the present invention. For example, an alternative to using movable carriages 13 and 14 to position heat source 31 at predetermined portion 33 of the reduced diameter optical preform rod 15 is to provide a means for moving support 32 to position heat source 31 along the length of the reduced diameter optical preform rod 15. Additionally, the above-described method of operating apparatus 10 can be modified to comprise, as an alternative to activating heat source 31 prior to activating clutch 24, first activating clutch 24 to apply uniform tension upon the reduced diameter optical preform rod 15 and then activating heat source 31 to start the formation of the pair of expanded beam cylindrically terminated optical fiber tapers 35.

What is claimed is:

1. A method of fabricating expanded beam optical fiber tapers, the method comprising the steps of:
   (a) fixedly mounting a first and a second opposite end of a reduced diameter preform rod in a first and second selectively rotatable holding means, respectively, where the reduced diameter optical preform rod comprises (1) a single core of predetermined uniform diameter including a material with a first index of refraction, a cladding layer of a material with a second index of refraction surrounding the core, and (3) an external diameter that is greater than the external diameter of a standard optical fiber but less than the external diameter of a standard optical preform rod;
   (b) heating a circumference of a predetermined portion at an intermediate point of the reduced diameter optical preform rod with a uniform heat to a predetermined temperature;
   (c) applying a longitudinal pulling force to the first end of the reduced diameter optical preform rod at a first predetermined uniform rate when the predetermined temperature is attained for (1) first forming a longitudinal elongation at the intermediate point that evolves into a first and a second inwardly directed taper on either side of the intermediate point, with each taper including a configuration that prevents mode conversion in a lightwave signal when propagating therethrough, and (2) then, with the continued application of the uniform rate pulling force to the first end of the reduced diameter preform rod, forming a short predetermined length cylindrical central section between the two narrow ends of the first and second tapers including a diameter smaller than that of the cylindrical end sections of the reduced diameter optical preform rod and corresponding to a standard diameter optical fiber;
   (d) concurrent with achieving the short cylindrical central section in step (c), longitudinally moving the predetermined portion of the reduced diameter preform rod being heated towards one of the tapers and in the direction from the second end toward the first end at a second predetermined uniform rate, which second predetermined uniform rate is slower than the first predetermined uniform rate, concurrent with the continued application of the first predetermined uniform pulling rate force on the first end of the reduced diameter optical preform rod of step (c), to provide material from the reduced diameter optical preform rod for extending the length of the cylindrical central section while maintaining the configuration of each preciously formed taper and the diameter of the cylindrical central section; and
   (e) severing the reduced diameter rod into two said fiber tapers by severing said rod at said cylindrical central section.

2. A method according to claim 1 wherein in performing step (b):
   (b1) predisposing the reduced diameter optical preform rod within a shielding tube to protect the reduced diameter optical preform rod from being burned when heated;
   (b2) niformly heating the reduced diameter optical preform rod with a flame; and
   (b3) concurrent with step (b2), uniformly rotating the reduced diameter optical preform rod and the shielding tube, with no torsion being applied to the reduced diameter optical preform rod, to provide uniform heating about the circumference of the predetermined portion at the intermediate point of the reduced diameter optical preform rod.

3. A method according to claim 1 wherein in performing step (b):
   (b1) uniformly heating the reduced diameter optical preform rod with a $CO_2$ laser; and
   (b2) concurrent with step (b1), uniformly rotating the reduced diameter optical preform rod, with no torsion being applied to the reduced diameter optical preform rod, to provide uniform heating about the circumference of the predetermined portion at the intermediate point of the reduced diameter optical preform rod.

4. A method according to claim 1 wherein in performing step (b);
   (b1) uniformly heating the reduced diameter optical preform rod with an electric furnace.

* * * * *